United States Patent
Horn et al.

(10) Patent No.: US 7,740,890 B2
(45) Date of Patent: Jun. 22, 2010

(54) PROCEDURE OF FUMIGATION WITH A HIGH CONCENTRATION OF PURE PHOSPHINE FREE FROM AMMONIA AT LOW TEMPERATURE FOR THE CONTROL OF PESTS IN FRUITS WITHOUT DAMAGING ITS QUALITY

(75) Inventors: Franziskus F. Horn, Santiago (CL); Francisco P. Horn, Santiago (CL); Pedro P. Horn, Santiago (CL); Juan P. Horn, Santiago (CL); Rodrigo M. Diaz, Santiago (CL)

(73) Assignee: Fosfoquim S.A. (CL)

( * ) Notice: Subject to any disclaimer, the term of this patent is extended or adjusted under 35 U.S.C. 154(b) by 1005 days.

(21) Appl. No.: 11/107,839

(22) Filed: Apr. 18, 2005

(65) Prior Publication Data
US 2005/0265892 A1 Dec. 1, 2005

(30) Foreign Application Priority Data
May 28, 2004 (CL) .................................. 1316-2004

(51) Int. Cl.
  A23B 4/16 (2006.01)
  A23B 7/00 (2006.01)
  B05B 7/00 (2006.01)
(52) U.S. Cl. .............. 426/312; 239/8; 239/397.5; 239/398; 426/320
(58) Field of Classification Search ................ 426/312, 426/320; 239/8, 397.5, 398
See application file for complete search history.

(56) References Cited

U.S. PATENT DOCUMENTS

| 5,662,865 | A | * | 9/1997 | Blatchford | 422/29 |
| 6,391,357 | B1 | * | 5/2002 | Muise et al. | 426/407 |
| 2002/0148913 | A1 | * | 10/2002 | Horn | 239/430 |

FOREIGN PATENT DOCUMENTS

| EP | 0826307 | 6/1990 |
| EP | 0508984 | 1/1991 |

OTHER PUBLICATIONS

Williams, P., Phosphines as a replacement for methyl bromide for postharvest disinfestation of citrus, 2000, Postharvest Biology and Technology, entire document.*
J. Larry Zettler et al., Final Report on HDS Fumigation Technology in Chile Recommendation to ASOEX, SAG and FFD on Future Needs, APHIS—Protecting American Agriculture, (2005 or prior).
Anne Bookout, Quarantine Fumigation of Perishables and Wood Packing Material, 1st Latin American Fumigants & Pheromones Conference and Workshop, pp. 228-231, date unknown.
Adel A. Kader, University of California Agriculture and Natural Resources, Publication 3311, Postharvest Technology of Horticultural Crops, Third Edition, p. 336, date unknown.

* cited by examiner

Primary Examiner—Brent T O'Hern
(74) Attorney, Agent, or Firm—Banner & Witcoff, Ltd.

(57) ABSTRACT

A procedure to control pests in fruits without damaging the quality of the fruit by exposing the fruit to a high phosphine concentration at low temperature during an extended period of time.

12 Claims, 1 Drawing Sheet

PROCEDURE OF FUMIGATION WITH A HIGH CONCENTRATION OF PURE PHOSPHINE FREE FROM AMMONIA AT LOW TEMPERATURE FOR THE CONTROL OF PESTS IN FRUITS WITHOUT DAMAGING ITS QUALITY

Applicants herewith claim the benefit of Chilean Patent Application No. 1316-04 filed May 28, 2004.

FIELD OF THE INVENTION

This invention is related with a fumigation procedure in which pure phosphine, free from ammonia is used at low temperature, where the gas is applied in cooled fumigation chambers, cooling chambers or controlled atmosphere chambers to temperatures between −1.5° C. and 15° C., for the control of pests in fresh fruit and vegetables.

BACKGROUND OF THE INVENTION

Many different procedures and products exist to control pests in export or import fruits before shipment or when received in the port of destination, with the purpose of avoiding the transmission of pests from a country to another.

Among the procedures traditionally used for this purpose, it can be mentioned the fumigation with methyl bromide, thermal treatments or storage to low temperature during long periods of time.

The treatment with methyl bromide, although quick and efficient, has a series of disadvantages. The product damages the ozone layer, the fumigation has to be carried out at high temperature, over 15° C., which implies to heat up the fruit which diminishes shelf life of fruit after the treatment, the gas is phytotoxic and therefore, it damages the fruit; the fruit treated with methyl bromide changes its flavor. Also, the methyl bromide, being very soluble in fatty tissues, it is easily absorbed by the operators and causes irreversible damages when being exposed even to non lethal concentrations.

The thermal treatments can be applied to some pests, but they always bear a great damage to the fruit and therefore, a drastic reduction of the shelf life of treated fruit, because it is not possible to assure that the whole fruit warms exactly to the desire temperature.

The cold storage, although does not damage the fruit in massive form, involves a high cost, since the fruit must be stored during periods of time that overcome 40 days with all the costs that implies to maintain the cooling system working, depreciation of facilities and equipments, and with the possible lost of value that implies the fact of not taking the fruit out on time.

In summary, given the characteristics of each treatment, the most viable treatment so far, has been the treatment with methyl bromide. However, as the gas is harmful for the ozone layer, many countries signed the Montreal Protocol, according to which they should try to eliminate or reduce to a maximum extent, the use of methyl bromide. All efforts are focused to find alternative to this gas.

For that reason, and for several years now, phosphine has been investigated as an alternative for the treatment of fresh fruit and vegetables.

Studies developed in Australia, New Zealand and USA for the control of pests in fresh fruit, have shown good results as for mortality of insects. However, they have had no good results in reference to quality of treated fruit, which had always suffered a damage.

This damage has been produced by two causes mainly: presence of ammonia and relatively high fumigation temperature, over 15° C., to which the tests have been carried out.

Only few years ago, until Horn Diluphos System, an equipment to dilute pure phosphine with air was invented, it had not been possible to apply pure phosphine for fumigations, since phosphine presents self ignition properties, at concentrations over 18000 ppm. Therefore, until that moment, the only possible way to apply phosphine, was through a reaction of hydrolysis of metal phosphides, which always generates ammonia and which is phytotoxic and thus damaging the fruit. Also, the metal phosphides practically do not react at low temperature, which eliminates the possibility to apply these products at low temperatures; also, the time required to generate phosphine gas can be also of several days, depending on the temperature and moisture.

The hydrolysis reaction requires a temperature higher than 15° C. to generate phosphine. Therefore, all the tests with phosphine for fruit fumigation were always carried out at high temperature, which damaged the fruit and reduced their shelf life.

Besides, it was of public knowledge that phosphine needed high temperatures to be able to eliminate the pests.

All previous tests were carried out at temperatures over 15° C. and therefore these tests proved to damage the fruit, a reason to consider phosphine as a non viable alternative for methyl bromide.

The publication in Spain ES 2093646, member of EP 0508984 family of patents (COMONWEALTH SCIENTIFIC INDUSTRIAL AND RESEARCH ORGANISATION) discloses a method and a device to fumigate with phosphine, an area that contains grain or a similar particulated material that consists in establishing a flow of constant lineal velocity through the grain, of a carrier gas containing phosphine, being the phosphine concentration in the carrier gas constant and between 4 and 200 micrograms per liter of gas, and having the carrier gas a flow velocity such that the gas separates from the surface of the grain or of a similar particulated material, at a speed between $0.5 \times 10^{-4}$ and $2.0 \times 10^{-4}$ meters per second.

The application CL1010-1996 that claims the priority UK 9511495.5 (DEGESCH DE CHILE LTDA.) discloses a process to generate a phosphine mixture and dilution gas, in which a metallic phosphide gets in contacts with liquid water in a generation space, hydrolyzing the metallic phosphide and liberating phosphine, which is extracted and diluted with a gas up to non flammable concentrations. This process is remarked because the metallic phosphide is liberated in the liquid water in the form of loose particles, free of phosphide powder, retarding agents of the hydrolysis and hydrophobic substances, and with the particularity that the generation space has an atmosphere of inert gas to the phosphine that is part, at least, of the dilution gas. On the other hand, the equipment used to carry out the process mentioned previously, is also disclosed.

The application CL 1011-1996 (DEGESCH DE CHILE LTDA.) discloses a metal phosphide composition for the phosphine production by means of hydrolysis, where the metallic phosphide is in the shape of particles of free fluency, and exempt of powder of metallic phosphide, hydrolysis retarding agents, specially coatings of hydrophobic substances and hydrophobic preservatives. Also the use of this composition to produce gas that contains phosphine and the process to prepare this composition is disclosed.

In the patent EP 0826307 the fumigation of stored particulated material is disclosed. Specifically, the device to carry out the simultaneous fumigation of any number of silos using a simple source of a mixture of carrier gas and a fumigant gas like phosphine is disclosed.

DESCRIPTION OF THE INVENTION

This invention refers to the surprising discovery that if the fumigation is carried out at low temperature (storage temperature) and with a high concentration of pure phosphine free from ammonia, it is possible to control the main pests of fruit without damaging the quality of the fruit at all.

Specifically, it refers to a procedure to carry out a fumigation in fresh fruit to a temperature between −1.5 and 15° C. with a concentration of pure phosphine free from ammonia, between 700 and 3500 ppm in a sealed enclosure, being the exposure time between 36 and 72 hours. The phosphine is obtained starting from cylinders of compressed phosphine, using the Horn Diluphos System or some other system that generates pure phosphine. In this procedure, if the Horn Diluphos System is used, no increase of pressure is generated inside the enclosure to be fumigated, since to introduce the gas to the enclosure, the air inside the facility is recirculated through the HDS system or an opening is left open in the chamber during the injection of the gas. Also, during the fumigation it is possible to leave the cooling system working.

So far, it was not believed possible to carry out this procedure to low temperatures. But, when lowering the temperature, it is possible to carry out the fumigation with higher dosage with no damage to the fruit, since at that temperature, the metabolism of the fruit is minimum.

The use of pure phosphine has as main advantage, compared to methyl bromide, and it is the fact that it does not leave toxic residues in the foods and that when being liberated to the atmosphere, it breaks down quickly to phosphoric acid by the action of sunlight. Although a minimum part of the phosphine is absorbed in the fruit, this residue disappears after some days of ventilation.

As pure phosphine becomes flammable in contact with air, it must be applied using the Horn Diluphos System (patented protected), which is an equipment that provides a safe method for direct dilution of phosphine with air to concentrations below the point of ignition.

It has been proved that different types of fruit can be efficiently treated without any damage in the treated fruits.

The fruit is preferably treated to the cold storage temperature of each fruit. For example, for apples, grapes, kiwis and berries, pears, nectarines, peaches, etc. it is preferred the treatment with temperatures from −1.5 to 2° C. Other fruits like avocados, citrus fruits, mangos are preferably to be treated to their corresponding cold storage temperature.

It has been demonstrated that it is possible to control the main pests of the fruit, such as the mealybugs, *Pseudococcus* spp; apple moth, *Cydia pomonella*; eulia, *Proeulia* spp; fruit tree weevil, *Naupactus xanthographus*; mediterranean fruit fly, *Ceratitis capitata*; fruit fly, *Bactrocera* spp, *Anastrepha* spp; false chilean mite, *Brevipalpus chilensis*; and *Thrips* spp.

The different pests, as well as the different states of each one of the pests have different sensibilities to the treatment. In general, we can say that the eggs are the most resistant, given their state of latency with low metabolism. The conditions mentioned previously in the description, correspond to those in which all states of the problematic pests are eliminated.

EXAMPLES

Example 1

Figure 1:
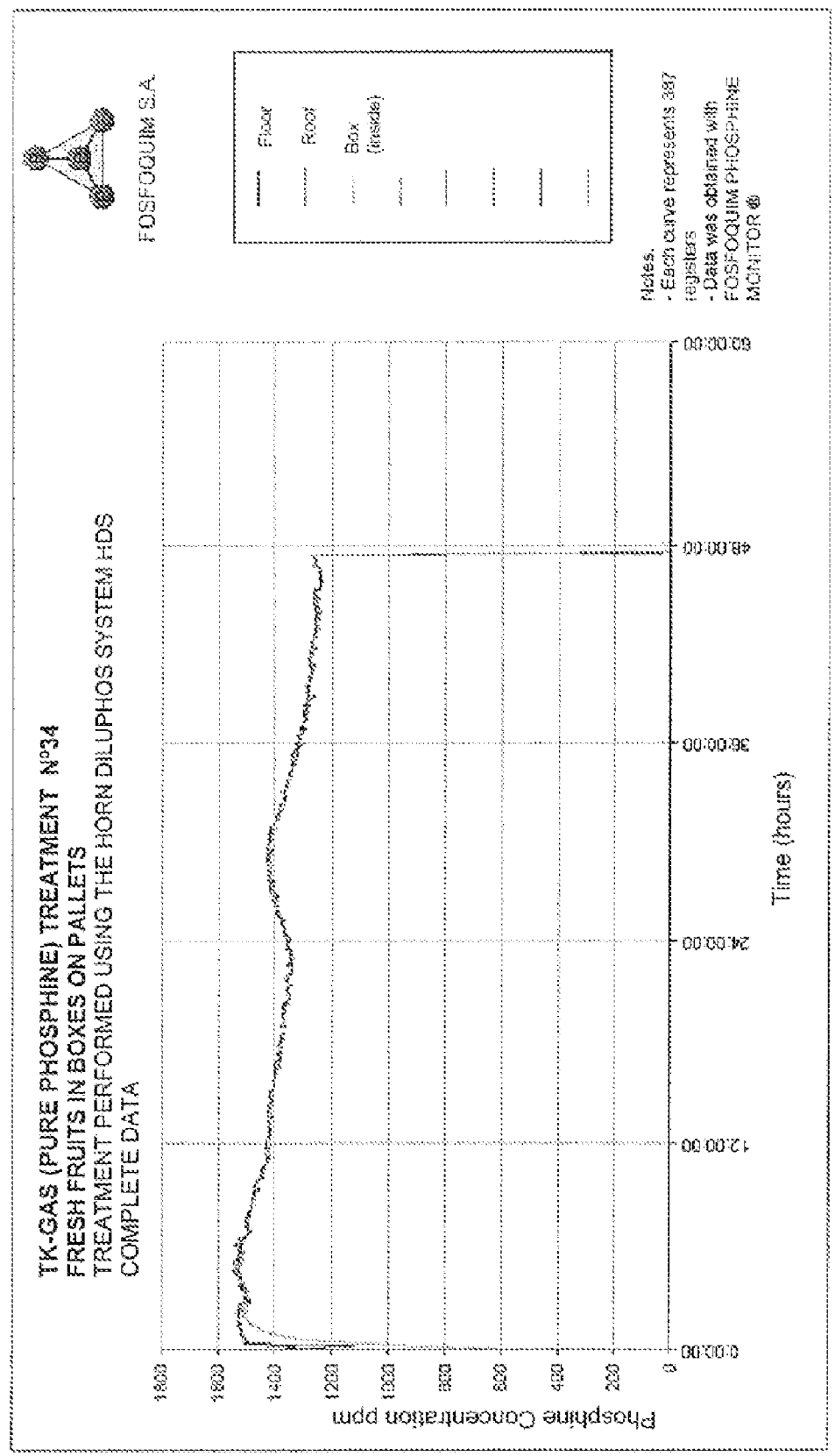
FIG. 1 is a graph that corresponds to registration of phosphine concentration during the treatment, described in Example 2.

Treatment was applied to a cooling chamber with controlled atmosphere, of 3740 cubic meters size, full with boxes of apples, using pure cylinderized phosphine TK-GAS® (VAPORPHOS in USA) using an equipment for the dilution of phosphine with air, the Horn Diluphos System (HDS).

In the process, the door of the chamber is closed tightly, the equipment for ethylene absorption is disconnected, the dilution equipment is connected to an air inlet pipe and to an air exhaust pipe. Then the air inside the chamber is recirculated through the HDS, in which the phosphine is added to air to a rate of 50 grams per minute. The mixture of phosphine and air that leaves the dilution equipment has a concentration of 10,000 ppm. To obtain a concentration of 1500 ppm inside the chamber, 2.1 grams of phosphine per cubic meter must be applied.

In order to monitor the phosphine concentration during the fumigation period, ¼ inch polyethylene probes were installed inside the chamber, in several points, which were connected to an Fosfoquim Phosphine Monitor which is a equipment for gas monitoring that registers the data with the hour and date when concentration was measured, to be able to download information to a computer, once the fumigation has finished.

Samples of insects and pests in different stages of development, were placed inside the chamber to be analyzed after the fumigation.

The chamber stayed sealed during 48 hours, and after this period there was still a concentration of 1300 ppm. After the 48 hours, the chamber was aerated until the concentration inside the enclosure was smaller than 0.3 ppm.

The temperature was maintained between −0.5° C. and +1° C. during the whole fumigation period.

The treated fruit was analyzed after aeration as for the mortality of the insects and for quality of fruit, even after 30 days.

Insects survivors were not detected in any development stage, neither the eggs emerged.

Changes in color and maturity were not detected, neither the conditions of the fruit compared with non treated fruit.

There were no organoleptic changes in the fruit after 6 days of treatment, compared with non treated fruit. Before 6 days, fruit taste was lightly metallic, which disappeared as time passed. Therefore, it is recommended not to consume the fruit before 6 days from ventilation.

All the insects and pests placed as samples inside the fumigated chamber were dead. Eggs did not emerge.

Example 2

A cooling chamber of 470 cubic meters size, conditioned for fumigations was treated with pure cylinderized phosphine TK-GAS® (VAPORPHOS in USA), using an equipment for phosphine dilution, the Horn Diluphos System (HDS), with different fruits inside the enclosure, such as apples, nectarines, pears, grapes and plums.

In the process, the door of the cooling chamber is hermetically closed, the dilution equipment is connected to an air inlet pipe and to an air exhaust pipe. Then the air inside the chamber is recirculated through the HDS, in which the phosphine is added to air to a rate of 50 grams per minute. The mixture of phosphine and air that leaves the dilution equipment has a concentration of 10,000 ppm.

To obtain a concentration of 1500 ppm 2.1 grams of phosphine per cubic meter were applied.

For monitoring phosphine concentration during the treatment, polyethylene lines were installed inside the chamber, one in a box with fruit and two other probe were placed in the free space inside the chamber; these probes were connected to a gas monitoring equipment, the Fosfoquim Phosphine Monitor model.

In the obtained concentration graph it is observed that the final concentration is reached in a short period of time and that later, once the exposure time was reached, the aeration of the chamber is quite fast.

It is also observed that the distribution of gas inside the treated enclosure, is even and immediate. The measurements at the free space, not only at the upper part but also the bottom area of the fumigated enclosure, are practically superimposed, and inside the box, it is seen that the gas penetrates almost immediately.

On the other hand, the concentration stays very even during the whole fumigation period, which indicates that the fruit does not absorb the gas, and that there are no leaks in the chamber.

Samples of non treated fruit were subject of the same post fumigation treatment, to be able to compare the treated fruit with non treated fruit.

The chamber stayed sealed during 48 hours with the cooling system running and at a temperature between $-0.5°$ C. and $+1°$ C.; after that period of time, there was still a concentration of 1300 ppm approx. After these 48 hours period, the chamber was aerated.

Damage in the treated fruit was not detected.

After 30 days from fumigation, an organoleptic test was carried out to determine if there was any change in flavor of fruit. No flavor change was detected when comparing the fumigated fruits with non fumigated fruits stored under the same conditions.

All insects analyzed after the treatment, were dead.

The invention claimed is:

1. Procedure to control pests in fresh fruits or vegetables without damaging the quality of the fruit or vegetable comprising exposing the fruit or vegetable to a mixture of pure phosphine and air at a phosphine concentration in a range between 700 and 3500 ppm and at a temperature between $-1.5°$ C. and $15°$ C.;
    wherein the pure phosphine is free of ammonia; and
    wherein the pure phosphine is combined with the air using a phosphine generation or dilution unit.

2. The procedure according to claim 1 wherein the fruit or vegetable is exposed to the mixture for a period of time between 36 and 72 hours.

3. The procedure according to claim 1 further comprising exposing the fruit or vegetables in a chamber selected from a fumigation chamber, a cooling chamber, or a controlled atmosphere chamber.

4. The procedure according to claim 1 wherein the pure phosphine is obtained from a phosphine cylinder.

5. The procedure according to claim 3 wherein air inside the chamber is recirculated through the phosphine generation or dilution unit avoiding a pressure increase in the chamber.

6. The procedure according to claim 3 wherein the pure phosphine and air mixture is injected into the chamber without recirculation, leaving an opening open during the injection to avoid a pressure increase in the chamber.

7. The procedure according to claim 1 further comprising maintaining the temperature using heat exchangers, wherein the heat exchangers comprise steel to avoid corrosion.

8. The procedure according to claim 1 wherein the fruit is fresh fruit with high moisture content.

9. A fumigation process comprising applying a mixture of pure phosphine and air at a phosphine concentration in a range between 700 and 3500 ppm to fresh fruit or vegetables at a temperature of between $-1.5$ and $15°$ C.;
    wherein the pure phosphine is free of ammonia; and
    wherein the pure phosphine is combined with the air using a phosphine generation or dilution unit.

10. The fumigation process according to claim 9 wherein the pure phosphine is obtained from phosphine cylinders.

11. The fumigation process according to claim 9 further comprising exposing the fruit to the pure phosphine and air mixture for a time period of 36 to 72 hours.

12. The fumigation process according to claim 9 further comprising exposing the fruit or vegetable in a sealed enclosure, recirculating air through the phosphine generation or dilution unit, and maintaining cooling during the process.

* * * * *